(12) United States Patent
Koyama

(10) Patent No.: US 6,678,122 B2
(45) Date of Patent: Jan. 13, 2004

(54) ACTUATOR BLOCK

(75) Inventor: Toshisada Koyama, Miyota-machi (JP)

(73) Assignee: Minebea Co., Ltd., Nagano (JP)

( * ) Notice: Subject to any disclaimer, the term of this patent is extended or adjusted under 35 U.S.C. 154(b) by 108 days.

(21) Appl. No.: 09/964,399

(22) Filed: Sep. 28, 2001

(65) Prior Publication Data
US 2002/0041471 A1 Apr. 11, 2002

(30) Foreign Application Priority Data
Oct. 6, 2000 (JP) .......................................... 2000-307918

(51) Int. Cl.[7] ................................................. G11B 5/55
(52) U.S. Cl. ..................................................... 360/265.6
(58) Field of Search ........................................ 360/265.6

(56) References Cited

U.S. PATENT DOCUMENTS 5,146,450 A * 9/1992 Brooks et al. ........... 360/265.6
6,128,165 A * 10/2000 Baker et al. ............. 360/265.6

* cited by examiner

Primary Examiner—Robert S. Tupper
(74) Attorney, Agent, or Firm—Oliff & Berridge, PPLC

(57) ABSTRACT

In order to facilitate fixing a pivot assembly to an actuator block and to obtain the stable coaxiality, a screw hole passing from the outside is provided towards a fitting hole into which the pivot assembly is inserted. Moreover, a set screw is screwed into a screw hole to press a sleeve of the pivot assembly, which has been inserted into the fitting hole with an end portion of the set screw. The sleeve pressed at a pressure $F_1$ with the set screw is clamped and fixed by a inside wall surface of the fitting hole and the end portion of the set screw revealing in the inner side of the fitting hole.

18 Claims, 4 Drawing Sheets

ACTUATOR BLOCK

BACKGROUND OF THE INVENTION

1. Field of the Invention

The present invention relates to a structure for axially supporting a head stack assembly (HSA) with a pivot assembly to support a magnetic head in a magnetic storage device for a computer such as a hard disc drive.

2. Description of the Related Art

A hard disc drive used in a magnetic storage device of a computer needs to be small in size but provided with a high storage capacity. To miniaturize the hard disc drive, reducing the diameter of a magnetic disc is effective and this has actually been practiced by reducing the diameter of the disc from 5 inches to 3.5, 2.5, 1.8, and 1 inch. Along with this, an increase of the storage capacity without changing the magnetic disc diameter is certainly attained.

FIG. 3 schematically shows the internal structure of the hard disc drive. A plurality of magnetic discs D are arranged at equal spacing along a rotary axis $C_1$ being driven rotationally in a unitary manner by a spindle motor (not shown). The writing and reading of data-information to the magnetic disc D is performed by means of a head stack assembly (hereinafter referred also to HSA) 1. The HSA 1 is provided with a plurality of head suspensions 2 supporting a magnetic head (not shown) at their end portion, where it is structured so that a pivot assembly 4 supports an actuator block 3 on which suspension support portions 3a are formed in a plurality of stages to support each of the head suspension 2.

The pivot assembly 4 is disposed along a rotary axis $C_2$ parallel to the rotary axis $C_1$, and a shaft 5 is inserted into a central portion thereof. In addition, the pivot assembly is provided with a sleeve 6 supported on the shaft 5 through a bearing. Since the actuator block 3 is fixed to the sleeve 6, it is possible to swing each head suspension 2 around the rotary axis $C_2$ together.

Furthermore, although not shown, a coil is provided at an end portion 3b opposite to the head suspensions 2 across the rotary axis $C_2$, and magnets are arranged on both sides of the coil to thereby form a voice coil motor. The HSA1 is rotated around the rotary axis $C_2$ by exciting the voice coil motor, and thus the magnetic head can be moved to a demanded position of the magnetic disc D.

To increase storage capacity on individual disc, the narrowing of tracks for writing and reading the data-information is necessary, where on the other hand it is inevitable to maintain the coaxiality of the pivot assembly 4 and the actuator block 3 highly precise to accurately trace the head for writing and reading on the narrow track.

FIGS. 4A and 4B show a conventional fitted portion between the actuator block 3 and the pivot assembly 4. FIG. 4A is a cross-section in the direction perpendicular to the shaft, and FIG. 4B is a cross-section in the axial direction. The fixation of the actuator block 3 to the pivot assembly 4 has been conventionally performed by adhesion. However, since this method of fixing with an adhesive requires an adhesive layer 8 is kept between the actuator block 3 and the sleeve 6 of the pivot assembly 4, it is inevitable to make large clearance (the difference in dimension) between the inner diameter of the actuator block 3 and the outer diameter of the sleeve 6. In addition, if the thickness of the adhesive layer is unequal (keeping equal thickness it is very difficult), the amount of the shrinkage of the adhesive layer 8 is different in each area, which would easily induce a large eccentricity. Moreover, it is difficult to settle direction of eccentricity once such an eccentricity occurs. Furthermore, using thermo-setting adhesive would involve a lot of factors making a precise control of coaxiality between pivot assembly 4 and actuator block 3 difficult. One of those factors is that the clearance between pivot assembly 4 and sleeve 6 of actuator block 3 differs before and after heating. In addition, a lot of problems in relation to the adhesion would be involved which are for example an absolute necessity of cleaning the adhering surface prior to adhesion, or no possibility of disassembly and rework after adhesion. Disassembly and rework after adhesion would be impossible.

SUMMARY OF THE INVENTION

The present invention has been made in view of the aforementioned aspects and its object is to facilitate the fixation of the pivot assembly to the actuator block and to obtain the stable coaxiality of the actuator block and the pivot assembly.

According to a first aspect of the present invention, an actuator block supported by a pivot assembly is characterized in that a screw hole passing through from the outside is provided in a fitting hole into which the pivot assembly is to be inserted, and contact portions between a sleeve of the pivot assembly and the fitting hole are formed at a predetermined distance in a circumferential direction respective to the screw hole.

According to the present invention, a screw is screwed into the screw hole so that the sleeve of the pivot assembly fitted into the fitting hole is pressed by the end portion of the screw. Thus, the sleeve of the pivot assembly is fixed by being clamped between the end portion of the screw and the contact portions in the interior of the fitting hole. At this moment, the pivot assembly becomes eccentric to the fitting hole, but the direction of the eccentricity is fixed. The degree of the eccentricity can be held to a minimum since the dimensional difference between the fitting hole and the sleeve of the pivot assembly can be kept to the minimum as long as the fitting process is not affected.

The actuator block according to a second aspect of the present invention is provided with contact portions at two areas. According to the present invention, the sleeve can be fixed at three areas, i.e., the two contact portions and the end portion of the screw.

The actuator block according to a third aspect of the present invention is characterized in that the contact portions are arranged by forming a non-contact surface against the sleeve in the predetermined area of the fitting hole, the area opposite to the screw hole across a center axis. In the present invention, the non-contact surface against the sleeve is arranged in the predetermined area of the fitting hole so that the end portions of the non-contact surface inevitably contact with the sleeve to form the contact portions.

The actuator block according to a fourth aspect of the present invention is characterized in that the contact portions are arranged by forming a non-contact surface against the fitting hole on the predetermined area of the sleeve, the area opposing a position confronting a screw hole provided in the fitting hole across a center axis. In the present invention, the non-contact surface against the fitting hole is arranged in the predetermined position of the sleeve so that the end portions of the non-contact surface inevitably contact with the fitting hole to form the contact portions.

The actuator block according to a fifth aspect of the present invention is characterized in that the sleeve is securely fixed by making the end of the screw screwed through the screw hole abut to a plain surface which is formed on the sleeve.

The actuator block according to a sixth aspect of the present invention is characterized in that the screw to be screwed into the screw hole is a set screw. The use of the set screw prevents an unnecessary protuberance to the outside of the actuator block.

BRIEF DESCRIPTION OF THE DRAWINGS

FIG. 1A is a cross-section in a direction perpendicular to a shaft, and FIG. 1B is a cross-section in an axial direction.

FIG. 2A is a cross-section in a direction perpendicular to a shaft and FIG. 2B is a cross-section in an axial direction.

FIG. 4A is a cross-section in a direction perpendicular to a shaft and FIG. 4B is a cross-section in an axial direction.

DESCRIPTION OF THE PREFERRED EMBODIMENTS

Figure 1A:
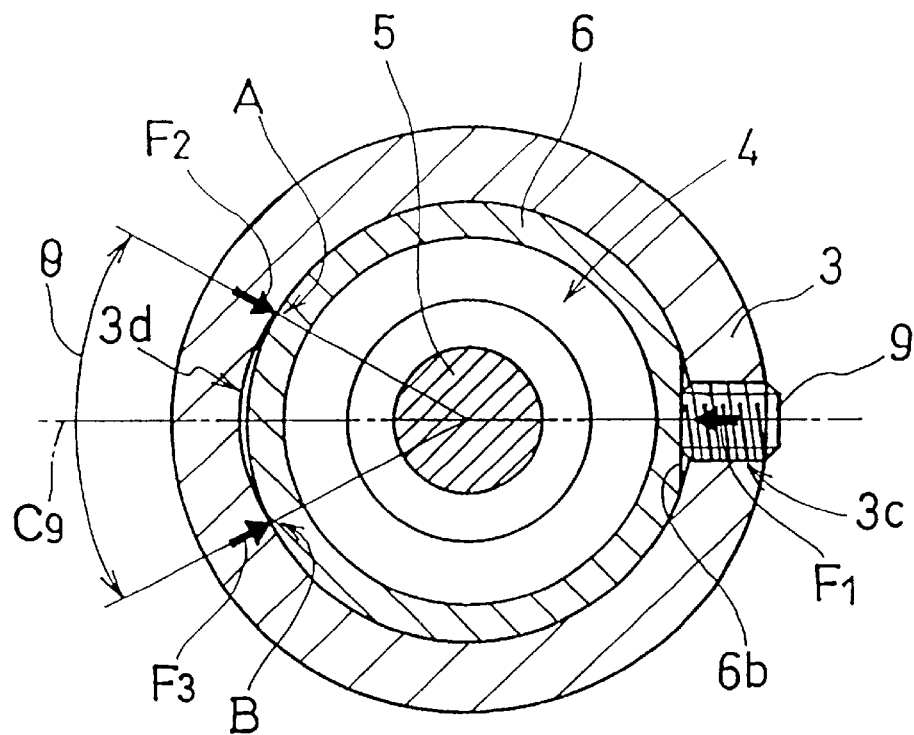
FIGS. 1A and 1B show a fitted portion between an actuator block and a pivot assembly according to an embodiment of the invention.

Hereinafter, embodiments of the present invention are described with reference to the accompanying drawings. The components identical with or corresponding to those in prior art are denoted by the same reference numerals, and detailed explanation will be omitted.

Figure 1B:
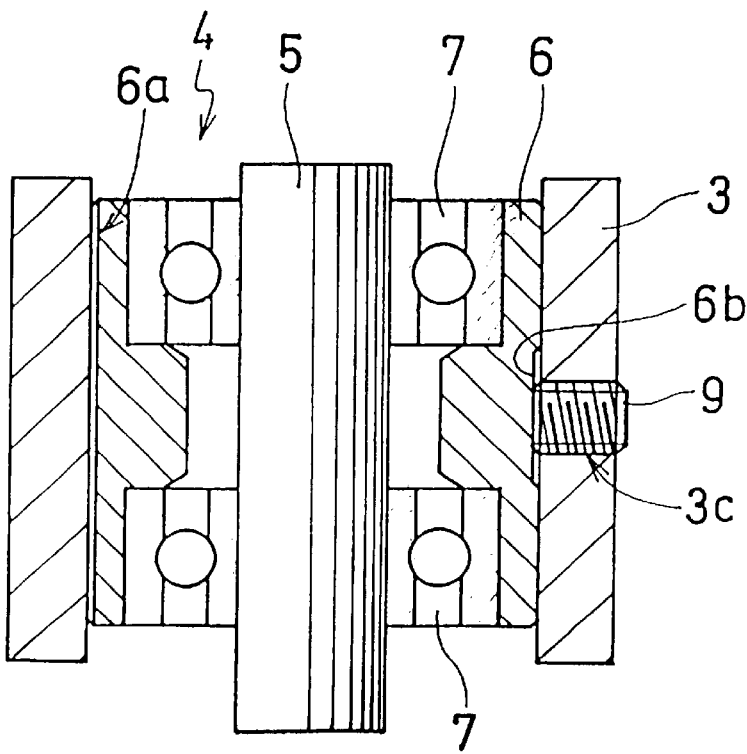

FIGS. 1A and 1B show a fitted portion between an actuator block 3 and a pivot assembly 4 according to an embodiment of the present invention. FIG. 1A is a cross-section in a direction perpendicular to a shaft, and FIG. 1B is a cross-section in the axial direction.

In the embodiment of the present invention, a fitting hole of the actuator block 3, into which the pivot assembly 4 is inserted, is provided with a screw hole 3c passing through from the outside. A set screw 9 is screwed into the screw hole 3c to press ($F_1$) a sleeve 6 of the pivot assembly 4 which has been inserted into the fitting hole with the end portion of the set screw 9. The sleeve 6 pressed at the pressure $F_1$ with the set screw 9 is clamped and fixed between the wall surface of the fitting hole and the end portion of the set screw 9 in the interior of the fitting hole.

Figure 4A:
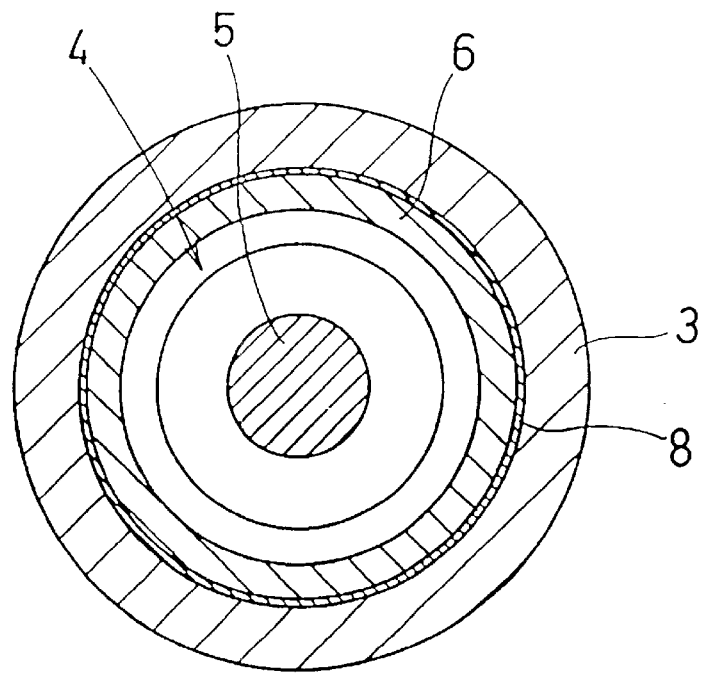
FIGS. 4A and 4B show a conventional fitted portion between an actuator block and a pivot assembly.
Figure 4B:
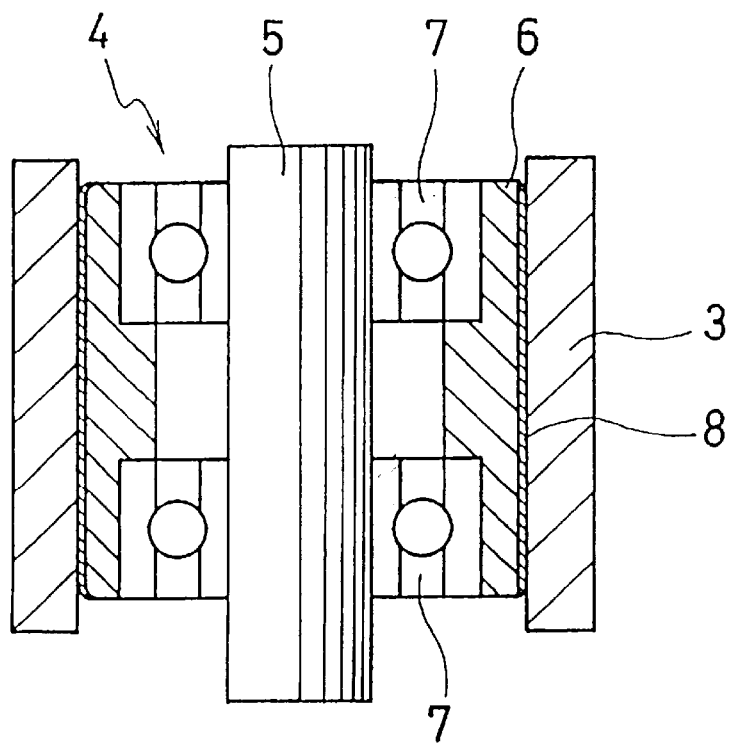

Unlike the prior art, it is unnecessary to provide an adhesive layer 8 (see FIGS. 4A and 4B) in the above embodiment, so that the clearance (the dimensional difference) between the fitting hole of the actuator block 3 and the sleeve 6 of the pivot assembly 4 can be kept to a minimum as long as the fitting process is not affected. Accordingly, although the pivot assembly 4 becomes eccentric to the fitting hole of the actuator block 3 after the sleeve 6 is pressed with the end portion of the set screw 9, the degree of the eccentricity can be held to a minimum. In addition, the minor eccentricity acts toward only one direction.

Furthermore, in the embodiment of the present invention, two contact portions A and B are arranged between the sleeve 6 of the pivot assembly 4 and the fitting hole at a predetermined distance in the circumferential direction opposite the screw hole 3c. As shown in FIG. 1A, the contact portions A and B are arranged by forming a non-contact surface 3d against the sleeve 6 in a predetermined place of the fitting hole of the actuator block 3, the place opposite to the screw hole 3c across a center axis. The non-contact surface 3d is, for instance, a recessed surface having a smaller radius of curvature than that of the fitting hole of the actuator block 3, and the angle θ across an axial direction $C_9$ of the set screw 9 is set to be in the range of 5°≦θ≦35°. Thus, the end portions of the non-contact surface 3d inevitably contact with the sleeve 6 to form contact portions A and B.

As shown in FIG. 1B, the contact portions A and B can be arranged by forming a non-contact surface 6a to the fitting hole, instead of the non-contact surface 3d provided in the actuator block 3, in a predetermined place in the sleeve 6, the place opposite to the position confronting with the screw hole 3c provided in the fitting hole. In this case, the non-contact surface 6a is formed into a convex surface having a larger radius of curvature than the radius of the outer circumferential surface of the sleeve 6, or a so-called D-cut shape, and is so provided that the angle θ having the axial direction $C_9$ of the set screw 9 at its center is in the range of 5°≦θ≦35°. Thus, the end portions of the non-contact surface 6a inevitably contact with the wall surface of the fitting hole of the actuator block 3 to form the contact portions A and B.

With the two contact portions A and B, the sleeve 6 can be stably fixed at three positions, i.e., the two contact portions A and B and the end portion of the set screw 9. It is preferable to set the range θ in which the non-contact surface 3d or 6a so that the three forces, i.e., reaction forces $F_2$ and $F_3$ from the contact portions A and B to the sleeve 6 and the pressure $F_1$ from the end portion of the set screw 9 to the sleeve 6 act in a direction for supporting the sleeve 6.

Furthermore, in the embodiment of the present invention, a plane surface 6b is formed in a place confronting the screw hole 3c provided in the pivot assembly 3 as required, and the end portion of the set screw 9 to be screwed into the screw hole 3c is contacted therewith. The condition of the contact between the end portion of the set screw 9 and the sleeve 6 is more firmly ensured.

As described above, according to the embodiment of the present invention, it is possible to join the actuator block 3 and the pivot assembly 4 without using any adhesive, and thus to solve a lot of disadvantages attributable to the adhesion. It is also possible to keep the degree of the eccentricity created between the actuator block 3 and the pivot assembly 4 to a minimum, and to settle eccentricity to one direction; thus, it is possible to obtain stable coaxiality between the actuator block 3 and the pivot assembly 4. Moreover, the screw to be screwed into the screw hole 3c serves as the set screw 9, so that the screw head can be entirely embedded in the screw hole 3c. Therefore, it is possible to prevent an unnecessary protuberance toward the outside of the actuator block.

Figure 2A:
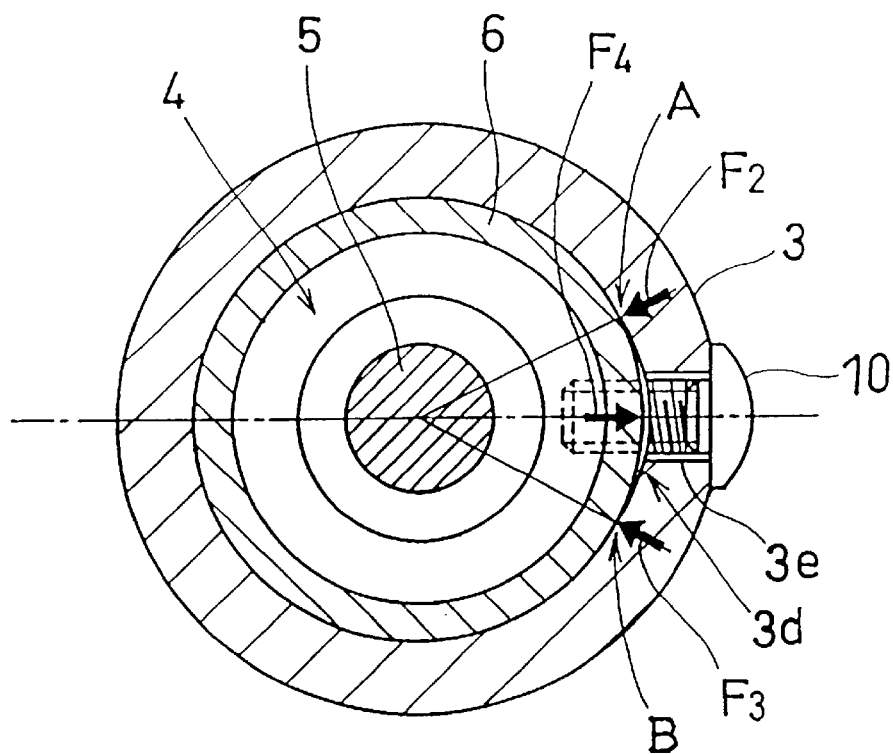
FIGS. 2A and 2B show another example of a fitted portion between an actuator block and a pivot assembly according to an embodiment of the invention.
Figure 2B:
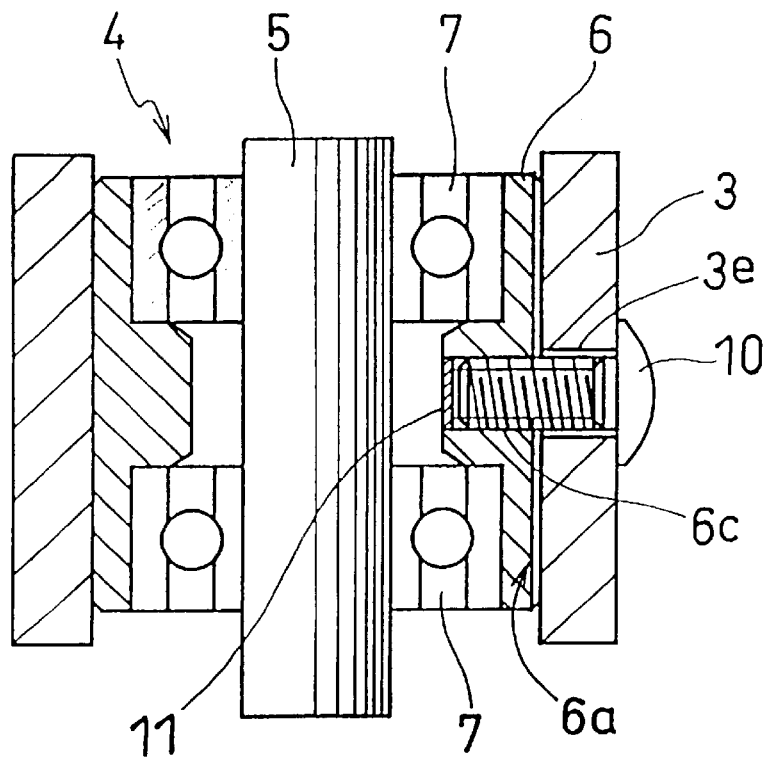
Figure 3:
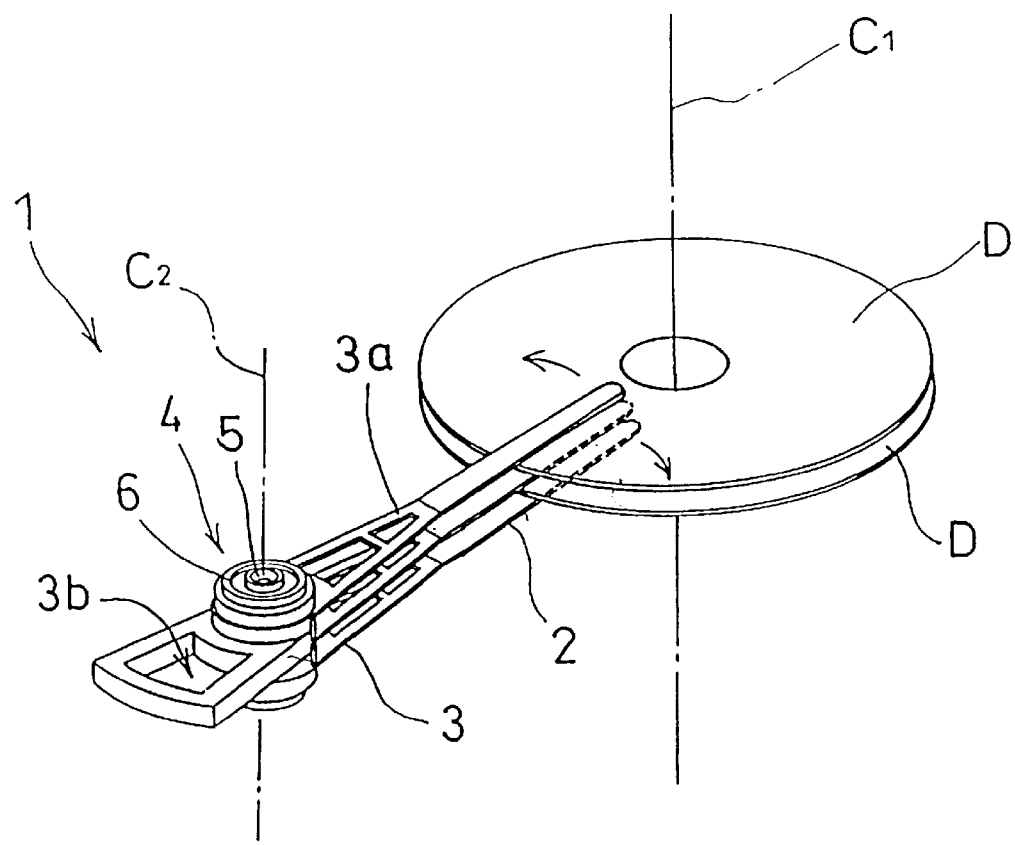
FIG. 3 is a schematic view showing an internal structure of a conventional hard disc drive.

FIGS. 2A and 2B show another fitting structure designed in the process of developing the fitting structure of the actuator block 3 and the pivot assembly 4 shown in FIGS. 1A and 1B. The structure shown in FIGS. 2A and 2B can be regarded as another embodiment of the present invention in view that the actuator block 3 and the pivot assembly 4 can be fitted together without using any adhesive.

The differences between the fitting structure shown in FIGS. 2A and 2B and that shown in FIGS. 1A and 1B will now be described. First of all, the fitting hole of the actuator block 3 is provided with a through hole 3e instead of the screw hole 3c (FIG. 1). Also, a screw hole 6c is formed at the portion confronting the through hole 3e provided in the fitting hole of the sleeve 6. Moreover, an inner end portion of the screw hole 6c is covered with a sealing 11 for a reason mentioned hereinafter. Furthermore, a non-contact surface 3d (FIG. 2A) of the fitting hole to the sleeve 6 or a non-contact surface 6a (FIG. 2B) of the sleeve 6 to the fitting hole, for forming the two contact portions A and B, is formed at a place overlapping the through hole 3e or the screw hole 6c. The screw 10 to be screwed into the screw hole 6c through the through hole 3e is a ordinary screw such as a small set-screw.

In the fitting structure shown in FIGS. 2A and 2B, the screw 10 is fastened to draw the sleeve 6 against the inside wall surface of the fitting hole of the actuator block 3, and thus to support and fix the sleeve 6 by the three forces, i.e., a tension $F_4$ of the screw 10 and reaction forces $F_2$ and $F_3$ of the two contact portions A and B.

In the embodiment shown in FIGS. 2A and 2B, it is absolutely necessary to remove metal-chips, produced while forming the screw hole 6c in the sleeve 6, in order to prevent that metal-chips enter into the bearing 7. It is also necessary to provide the sealing 11 on the screw hole 6c to prevent foreign material from entering through the screw hole 6c. The requirement of these counter measures against foreign material reveals minor disadvantages in comparison with the embodiment shown in FIGS. 1A and 1B. However, in spite of this, the embodiment shown in FIGS. 2A and 2B remains superior to the prior art (FIGS. 4A and 4B) in view that it overcomes disadvantages attributable to the adhesion.

Thus, according to the present invention, the following advantages can be taken. First, the actuator block according to a first aspect of the present invention solves a lot of disadvantages attributable to the fixation of the actuator block and the pivot assembly using an adhesive, facilitates the fixation of the pivot assembly to the actuator block, and provides stable coaxiality of the actuator block and the pivot assembly.

Secondly, in the actuator block according to a second aspect of the present invention, it is possible to fix the sleeve stably to the fitting hole of the actuator block at three positions, i.e., the two contact portions and the end portion of the screw.

Thirdly, in the actuator block according to a third aspect of the present invention, the non-contact surface against the sleeve is arranged in a predetermined place of the fitting hole so that the end portion of the non-contact surface inevitably gets in contact with the sleeve to form the contact portions. Thus, the sleeve can be stably fixed at the three positions, i.e., the two contact portions and the end portion of the screw.

Fourthly, in the actuator block according to a fourth aspect of the present invention, the non-contact surface against the fitting hole is arranged in a predetermined place of the sleeve so that the end portion of the non-contact surface inevitably gets in contact with the fitting hole to form the contact portion. Thus, the sleeve can be stably fixed at the three positions, i.e., the two contact portions and the end portion of the screw.

Fifthly, in the actuator block according to a fifth aspect of the invention, the condition of the contact between the end portion of the screw to be screwed into the screw hole and the sleeve is more firmly ensured by the plane surface, which makes it possible to fix the sleeve stably.

Finally, in the actuator block according to a sixth aspect of the invention, it is possible to embed the screw head in the screw hole of the actuator block to prevent an unnecessary protuberance toward the outside of the actuator block.

What is claimed is:

1. An actuator block axially arranged in a pivot assembly, wherein a thread hole passing through from outside the actuator block is formed towards a fitting hole inside the actuator block into which said pivot assembly is inserted, a first contact portion of a contact between a sleeve of said pivot assembly and said fitting hole is arranged circumferentially at a predetermined distance from said thread hole, and a plane surface is arranged on the sleeve opposite to said thread hole, an end of a screw screwed through said thread hole abutting said plane surface.

2. The actuator block according to claim 1, wherein said first contact portion and a second contact portion are arranged in two areas.

3. The actuator block according to claim 2, wherein said first and second contact portions are arranged by forming a non-contact surface against the sleeve in a predetermined area of the fitting hole opposing the thread hole across a center axis of the fitting hole.

4. The actuator block according to claim 2, wherein said first and second contact portions are arranged by forming a non-contact surface against the fitting hole in a predetermined area of the sleeve, the predetermined area opposing the thread hole across a center axis of the fitting hole.

5. The actuator block according to claim 1, wherein the screw screwed into the thread hole is a set screw.

6. The actuator block according to claim 2, wherein the screw screwed into the thread hole is a set screw.

7. The actuator block according to claim 3, wherein the screw screwed into the thread hole is a set screw.

8. The actuator block according to claim 4, wherein the screw screwed into the thread hole is a set screw.

9. An actuator block axially arranged in a pivot assembly, wherein a thread hole passing through from outside the actuator block is formed towards a fitting hole inside the actuator block into which the pivot assembly is inserted, a first contact portion of a contact between a sleeve of the pivot assembly and the fitting hole is arranged circumferentially at a predetermined distance from the thread hole, and a screw hole formed in the sleeve extends the thread hole into the sleeve, a screw screwed through the thread hole screwing into the sleeve via the screw hole.

10. The actuator block according to claim 9, wherein a sealing is provided at an inner end of the screw hole.

11. The actuator block according to claim 9, wherein said first contact portion and a second contact portion are arranged in two areas.

12. The actuator block according to claim 9, wherein said first and second contact portions are arranged by forming a non-contact surface against the sleeve in a predetermined area of the fitting hole between the thread hole and the screw hole.

13. The actuator block according to claim 9, wherein said first and second contact portions are arranged by forming a non-contact surface against the fining hole in a predetermined area of the sleeve between the thread hold and the screw hole.

14. The actuator block according to claim 9, wherein the screw is a set screw.

15. The actuator block according to claim 10, wherein the screw is a set screw.

16. The actuator block according to claim 11, wherein the screw is a set screw.

17. The actuator block according to claim 12, wherein the screw is a set screw.

18. The actuator block according to claim 13, wherein the screw is a set screw.

* * * * *